US005486968A

United States Patent [19]
Lee et al.

[11] Patent Number: 5,486,968
[45] Date of Patent: Jan. 23, 1996

[54] METHOD AND APPARATUS FOR SIMULTANEOUS WRITE HEAD PLANARIZATION AND LEAD ROUTING

[75] Inventors: Hin P. E. Lee, San Jose; Douglas J. Werner, Fremont, both of Calif.

[73] Assignee: International Business Machines Corporation, Armonk, N.Y.

[21] Appl. No.: 149,891

[22] Filed: Nov. 10, 1993

[51] Int. Cl.$^6$ .............................. G11B 5/31; G11B 5/17; G11B 5/39
[52] U.S. Cl. .............. 360/126; 360/113; 360/123
[58] Field of Search .................... 360/113, 126, 360/127, 123

[56] References Cited

U.S. PATENT DOCUMENTS

| | | | |
|---|---|---|---|
| 3,908,194 | 9/1975 | Romankiw | 360/113 |
| 4,416,056 | 11/1983 | Takahashi | 29/603 |
| 4,504,880 | 3/1985 | Church et al. | 360/113 |
| 4,800,454 | 1/1989 | Schwarz et al. | 360/103 |
| 4,855,854 | 8/1989 | Wada et al. | 360/126 |
| 5,041,932 | 8/1991 | Hamilton | 360/104 |
| 5,111,351 | 5/1992 | Hamilton | 360/104 |
| 5,224,003 | 6/1993 | Matsui | 360/123 |
| 5,256,249 | 10/1993 | Hsie et al. | 156/656 |
| 5,270,893 | 12/1993 | Sasaki et al. | 360/113 |
| 5,313,352 | 5/1994 | Chikazawa et al. | 360/103 |

OTHER PUBLICATIONS

Anonymous, "PL Permalloy Planarization for Coil Plating", Research Disclosure N271, Nov. 1986.

*Primary Examiner*—Robert S. Tupper
*Attorney, Agent, or Firm*—Ingrid M. Foerster

[57] ABSTRACT

Disclosed is a planarizing layer for use in an MR read/inductive write head combination, and a method for constructing the same. In the preferred embodiment, a planarizing layer comprising a plurality of planar sections of conductive material is formed in the plane of the lower pole piece of an inductive head. The planar sections, in cooperation with the lower pole piece, provide a substantially planar surface on which to form the inductive coil. Two of the planar sections are electrically coupled to respective MR leads, and include protrusions extending from the perimeter of the inductive coil to enable electrical access by a pair of read terminal pads. A third planar section is electrically coupled to the inner coil tap of the inductive coil, and includes a protrusion extending from the perimeter of the inductive coil to enable electrical access by a write terminal pad.

51 Claims, 17 Drawing Sheets

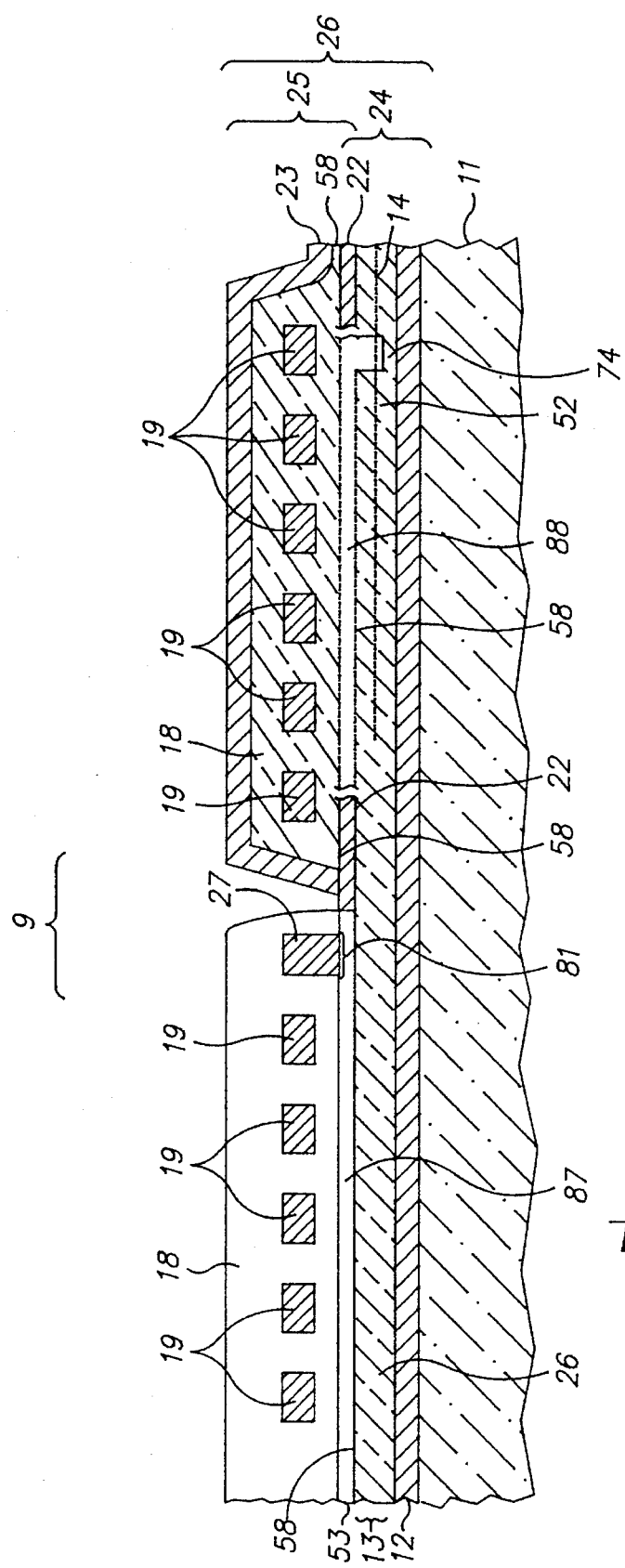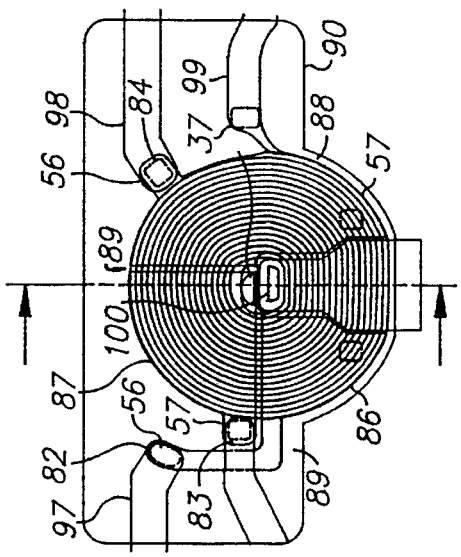
FIG. 5B

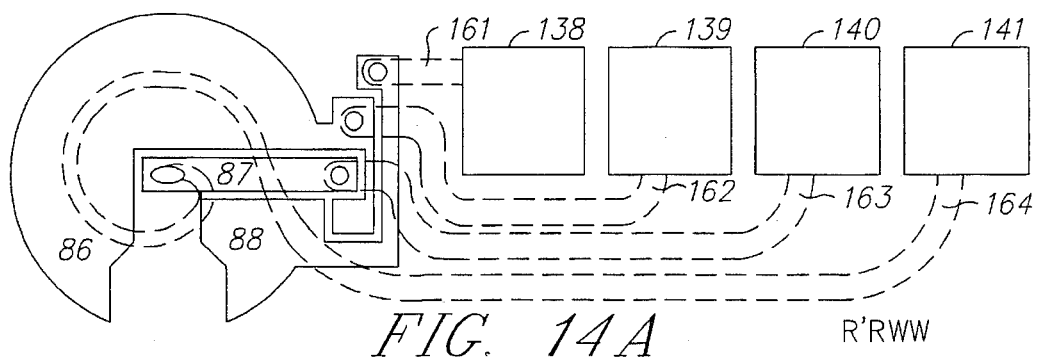
FIG. 14A  R'RWW
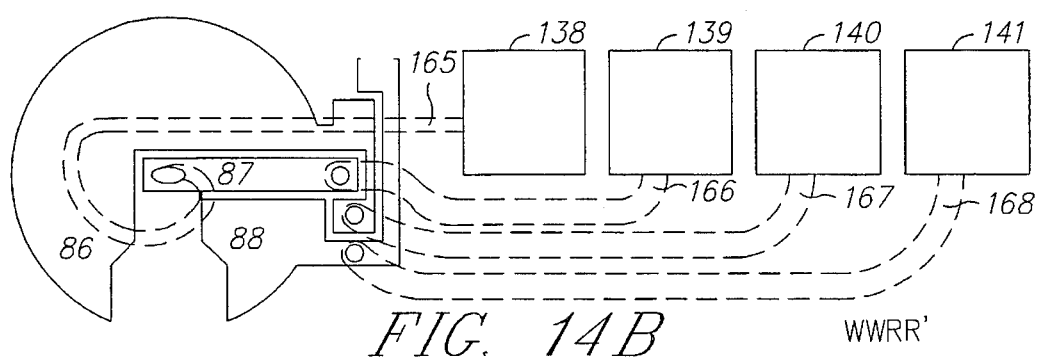
FIG. 14B  WWRR'
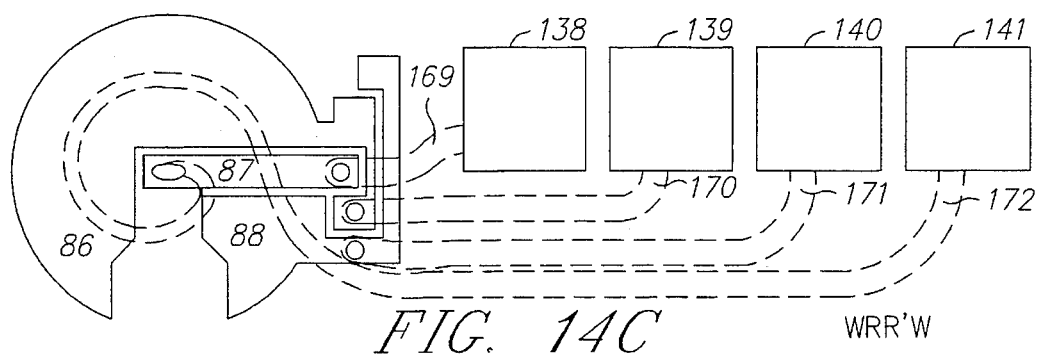
FIG. 14C  WRR'W
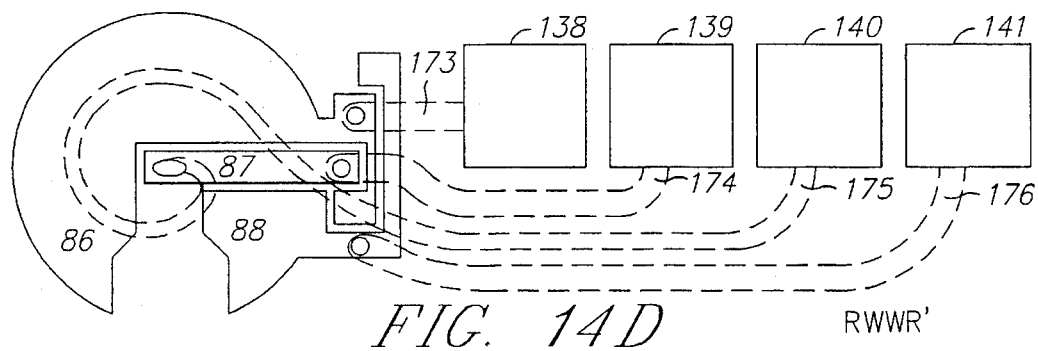
FIG. 14D  RWWR'

5,486,968

METHOD AND APPARATUS FOR SIMULTANEOUS WRITE HEAD PLANARIZATION AND LEAD ROUTING

BACKGROUND OF THE INVENTION

The present invention relates generally to a read/write head assembly for use in a computer data storage drive, and in particular, to a read/write head having a conductive lead arrangement for providing a substantially planar surface on which to form an inductive write element.

State of the art thin film read/write structures in data storage systems generally include an inductive write head in combination with either an inductive or magnetoresistive (MR) read head.

One type of MR/inductive write head arrangement includes an inductive write head assembly formed adjacent to a magnetoresistive read head subassembly, separated by a layer of gap material. The read head includes an MR element and corresponding MR leads in a "read gap" formed by two soft magnetic shielding layers. The MR element and leads are electrically isolated from the shielding layers by an insulating material in the read gap. The write head includes an inductive coil, a magnetic yoke having upper and lower pole pieces which surrounds a portion of the coil, and insulating material within the yoke to electrically isolate the yoke from the coil. This type of read/write head assembly is sometimes referred to as a "piggy-back" structure.

In a second known MR/inductive head combination, the lower pole of the magnetic yoke also serves as one of the shielding layers of the read assembly. Such an arrangement is commonly referred to as a "merged" head design.

One disadvantage of the layered structures described above is the uneven or "stepped" topography beneath the inductive coil. The unevenness is primarily due to the protrusion of the lower pole piece. Although step abruptness is smoothed to some degree by a layer of insulating material beneath the coil, substantial unevenness remains. Consequently, formation of the coil may result in notched or broken resist lines along the step ridges, adversely affecting write head performance and yield.

It is therefore desirable to provide a substantially even, planar surface beneath the inductive coil. U.S. Pat. No. 4,855,854 suggests a planarization process wherein insulation layers applied before and after the formation of an inductive coil are mechanochemically polished to correct unevenness. This solution, however, introduces additional steps to the manufacturing process.

In an alternative solution the lower pole piece is extended along the entire length of the substrate to form a planar surface beneath the inductive coil. In a merged head design, however, such a pole extension increases the risk of shorting between the lower pole piece and the shielding layer of the "piggy-back" head or the MR leads of the "merge" head.

A further disadvantage of the "piggy-back" and "merged" head designs is the required dimensions of the MR leads. In previous designs, the MR leads extended beyond the perimeter of the inductive coil to enable electrical contact with read terminal pads external to the head assembly. But as read gaps become smaller, the problems of lead resistance and electrical shorting between the leads and the shielding layers of the "piggy-back" head, or between the leads and the shielding layer and lower pole piece of the "merged" head become greater concerns. It is therefore desirable to reduce the length and total area of the MR leads.

Yet another disadvantage of the previous designs is the necessity for an overpass connector to the inner coil tap. The overpass connection may compromise slider height reduction in disk drives with small slider height tolerances.

Read/write assemblies are generally formed on either a central or side rail of a slider. In a known center rail arrangement, terminal pads are typically connected to the MR leads and coil taps in a "write-read-read-write" (WRRW) pattern. However, design constraints may require any arbitrary terminal pad arrangement. This may be the case for either center rail or side rail designs. It is therefore desirable to develop a read-write head assembly having a conductive planarizing layer which easily facilitates a variety of terminal pad arrangements, and is adaptable to either center rail or side rail designs.

SUMMARY OF THE INVENTION

In view of the foregoing observations, it is therefore an object of the present invention to overcome the disadvantages associated with MR/inductive head structures.

Specifically, it is an object of the present invention to provide a planarizing layer for use with an inductive head to provide a substantially planar surface in cooperation with the lower pole piece on which the coil may be formed.

It is a further object of the present invention to provide a planarizing layer for use with an MR read/inductive write head assembly which provides means for electrical connection between the MR leads and corresponding read terminal pads on the trailing edge of a slider.

Another object of the present invention is to provide a planarizing layer for use with an inductive head which provides means for electrical connection from below between the inner tap and a corresponding write terminal pad on the trailing edge of a slider.

It is a furthers object of the present invention to provide a method for adding a planarization layer to an inductive head assembly.

Another object of the present invention is to provide an inductive write head including a planarization layer for improved head yield and performance.

A further object of the present invention is to provide an inductive write head including a planarizing layer below the inductive coil which provides electrical connection between a slider terminal pad and the inner coil tap.

It is a further object of the present invention to provide an MR read/inductive write head assembly including a planarizing layer below the inductive coil which provides electrical connection between the MR leads and the slider read terminal pads in a manner which does not require the MR leads to extend beyond the perimeter of the inductive coil.

Another object of the present invention is to provide a conductive planarizing layer in the plane of the lower pole piece to facilitate alternative terminal pad arrangements arising due to design constraints.

BRIEF DESCRIPTION OF THE DRAWINGS

The foregoing and other objects, features and advantages of the present invention will be apparent from the following detailed description of the preferred embodiments, with reference to the accompanying figures of the drawings, in which:

FIG. 5(b) is across-sectional view of a preferred embodiment of a merged head assembly having a planarizing layer;

FIGS. 14(a)–(d) are plane views of the preferred embodiment of a planarizing layer in a side-rail design connected in four alternative terminal pad arrangements.

DESCRIPTION OF THE PREFERRED EMBODIMENT

Figure 1:
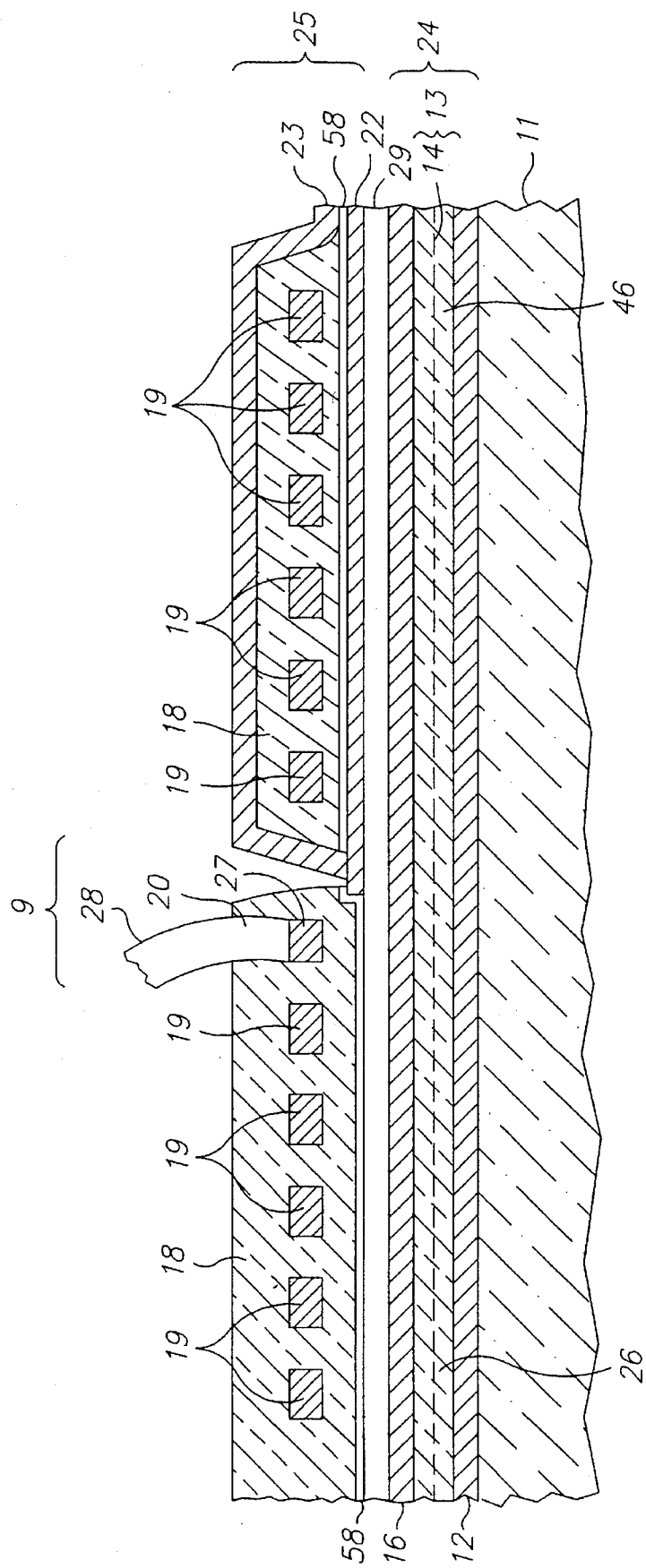
FIG. 1 is a cross-sectional view of a known magnetoresistive sensor/inductive write head assembly.
Figure 4:
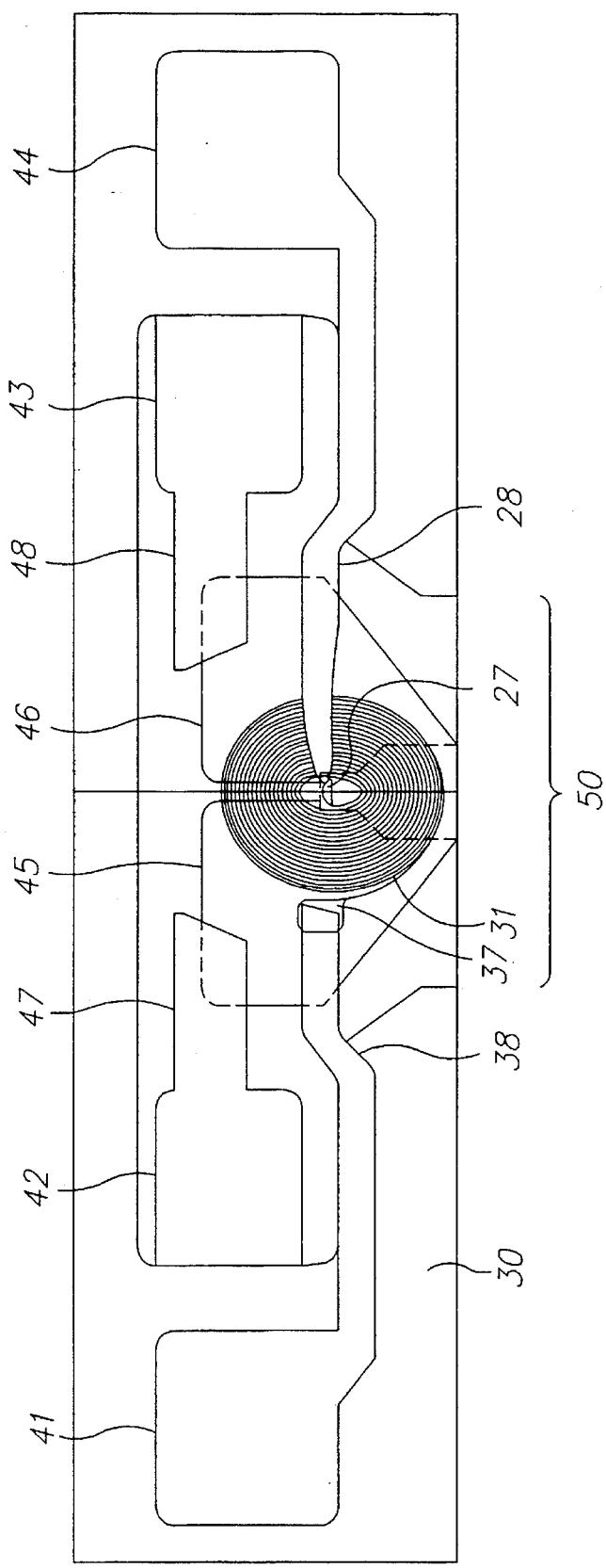
FIG. 4 is a plane view of a known center rail slider design having a WRRW terminal pad arrangement.

One type of MR/inductive write head arrangement is shown in FIG. 1. It includes a magnetoresistive head subassembly 24 with first and second soft magnetic shielding layers 12, 16 defining a read gap 13; an MR element 14 disposed in the read gap 13; a pair of planar conducting leads 45, 46 in contact with the MR element 14 and extending from the subassembly 24 (only one visible); and insulating material 26 in the gap 13 for electrically isolating the MR element and corresponding leads from the shielding layers 12, 16. The shielding layers 12, 16 typically comprise a soft ferromagnetic material such as sendust or NiFe, and are formed by conventional methods such as chemical vapor deposition (CVD) or sputtering or plating. The insulating material 26 comprises any material suitable for electrically isolating the conductive layers of the read head, e.g. $Al_2O_3$, $SiO_2$, etc. The read gap is usually formed by first applying a layer of insulating material to shielding layer 12 by conventional means. The MR element 14 is then formed by subtractive etching or another suitable process, and leads 45, 46, such as those shown in FIG. 4, are formed thereon, e.g., by methods such as electro-plating, sputtering or evaporation. Another layer of insulating material is then applied over the MR element 14 and leads 45, 46. Finally, the second shielding layer 16 is formed over the completed read gap 13.

The inductive write head subassembly is formed adjacent to the read head subassembly and is electrically isolated from the same by an insulating gap layer 29. The subassembly includes an inductive coil 19 having an inner tap 27 and an outer hap (not shown), a magnetic yoke comprising first and second pole pieces 22, 23 connected at the coil center 9 to form a back gap, insulating material 18 over the coil 19 and between the pole pieces 22, 23 to electrically isolate the coil 19 from the yoke, and a conductor 28 coupled to an external write terminal pad (not shown) passing over the coil to contact the inner coil tap 27. Note that the turns of the coil external to the yoke are not level with the turns within the yoke. The gap layer 29 comprises insulating material such as $Al_2O_3$ or $SiO_2$ applied by conventional means such as sputtering or CVD. The lower pole piece 22 is formed on the gap layer 29 by a suitable method such as electro-plating or sputtering. Insulating material 18 is applied over the lower pole piece 22 to provide an electrically insulated surface on which to form the inductive coil 19. A back portion of the pole piece is kept exposed by a via hole formed in the insulating material 18 for later access by the upper pole piece 23. The inductive coil 19 is applied, e.g., by electro-plating successive copper layers onto the insulating material over lower pole piece 22. The coil 19 is coated with more insulating material 18 to electrically isolate it from the upper pole piece 23, which is applied next by conventional means such as electro-plating or subtractive etching. The read/write head assembly just described is sometimes referred to as a "piggy-back" structure.

Figure 2A:
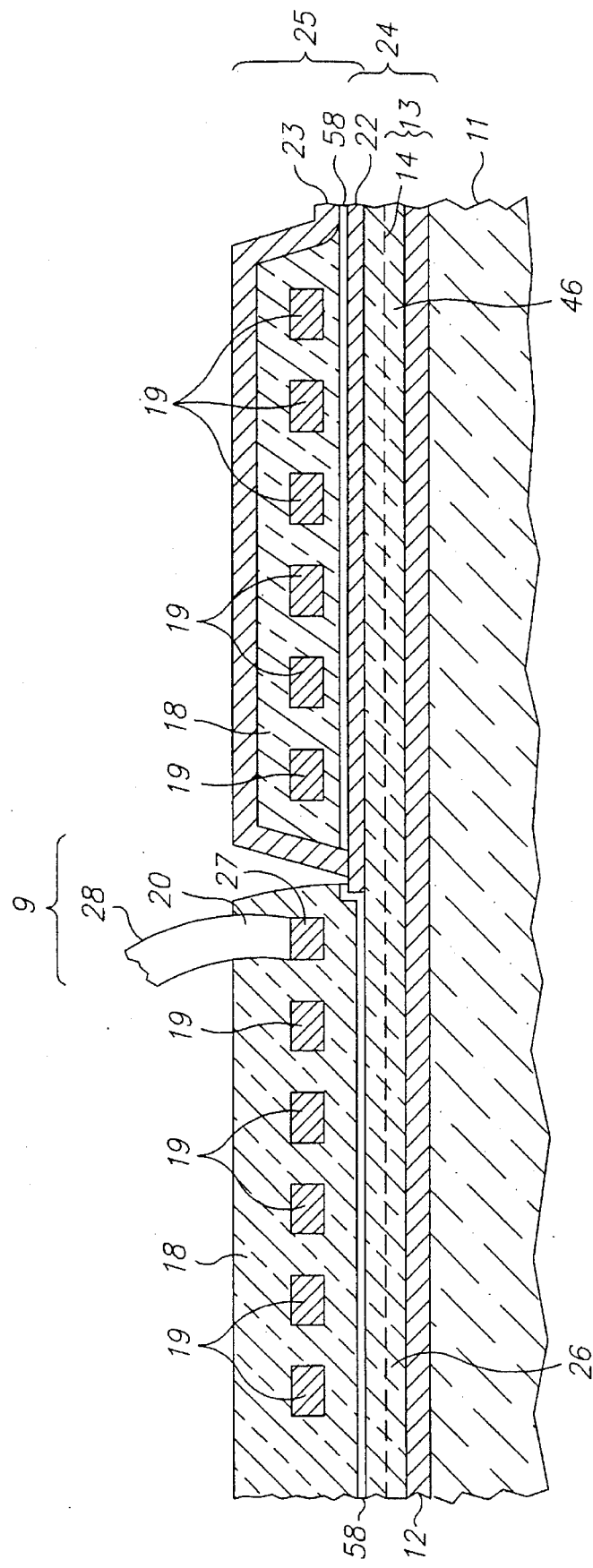
FIG. 2(a) is across-sectional view of a known "merged" magnetoresistive sensor/inductive write head assembly.
Figure 2B:
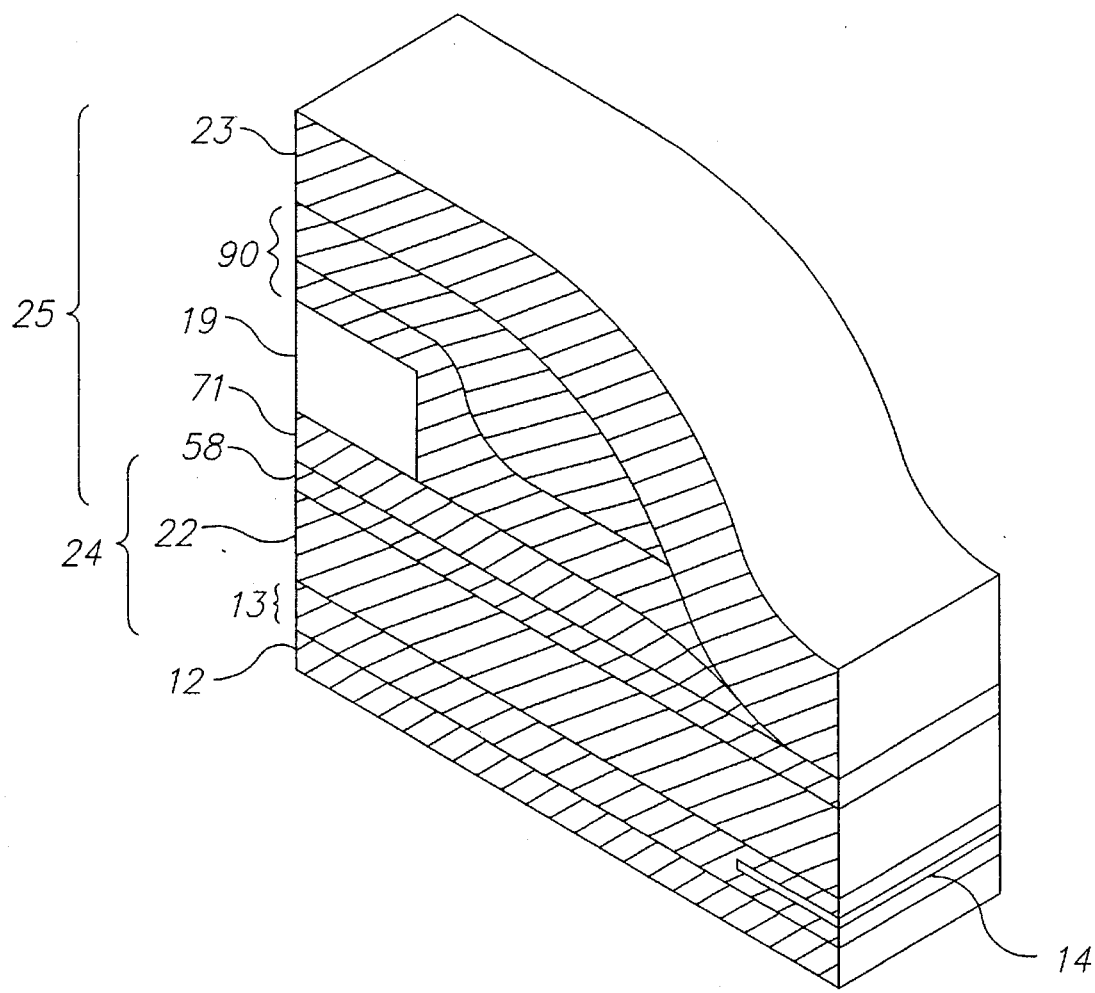
FIG. 2(b) is a detailed perspective cross-sectional view of the layers in the merged head assembly of FIG. 2(a)

FIGS. 2(a) and (b) illustrate a second known MR/inductive head combination in which first pole piece 22 also serves as the second shielding layer 16 of the read assembly 24 of FIG. 1. Again, note the unevenness of the coil turns in FIG. 2(a). Such an arrangement is commonly referred to as a "merged" head design.

Figure 3:
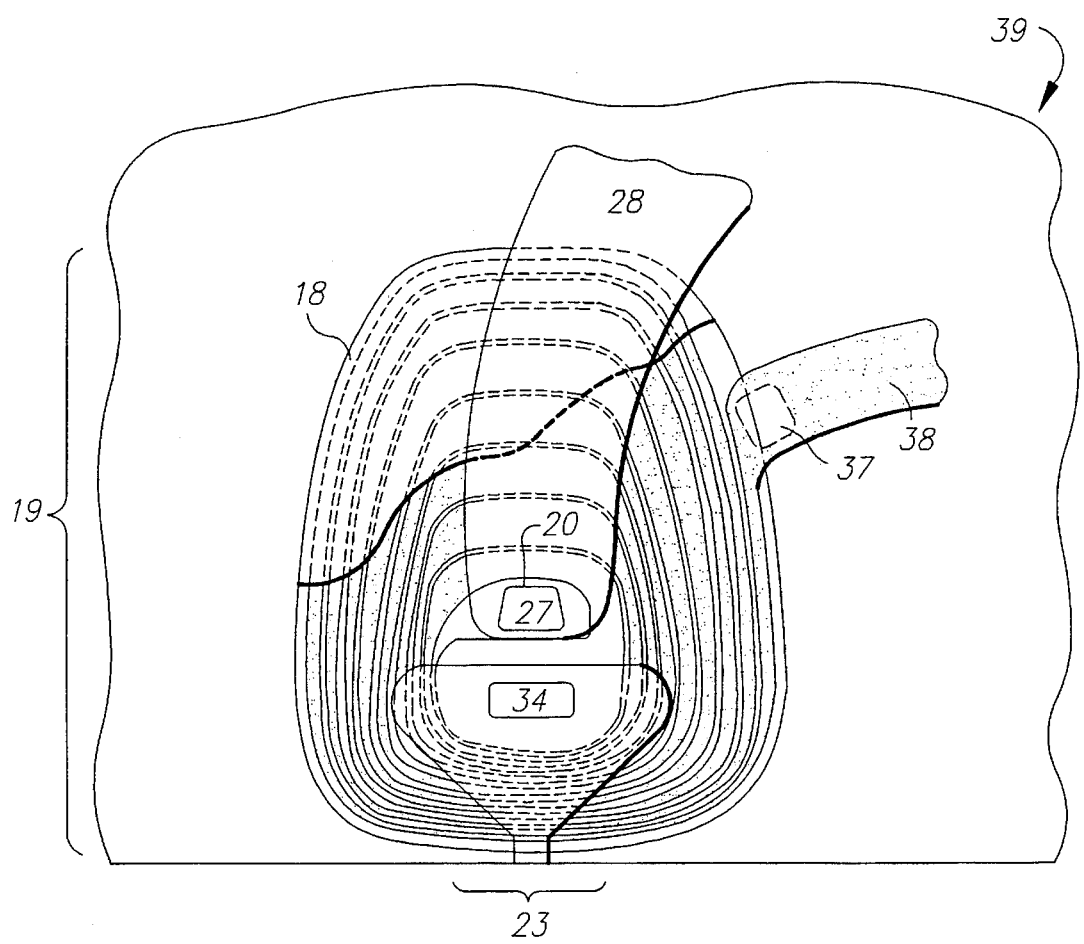
FIG. 3 is a plane view of an inductive write coil having an "overpass" outer coil tap connector.

An overpass connector 28 which has been used with previous read/write head assemblies is shown in FIG. 3. Connector 28 provides electrical coupling between a write terminal pad (not shown) and the inner tap 27 of the inductive coil 19. The connector 28 has access to the inner coil tap 27 through a via hole 20 formed in the insulating material 18.

FIG. 4 depicts the trailing edge 30 of a slider having a centrally positioned read/write head assembly 50 with terminal pads 41–44 symmetrically arranged on either side. The outer terminal pads 44, 41 are connected to the inner and outer coil taps 27, 37 of inductive coil 19, respectively. The inner terminal pads 42, 43 are connected to MR leads 45, 46 extending out from beneath the coil 19. Note that the MR leads extend beyond the perimeter of the inductive coil 19 to enable access by the read terminal pads 42, 43. The terminal pads 41–44 are shown in a write-read-read-write arrangement.

Figure 5A:
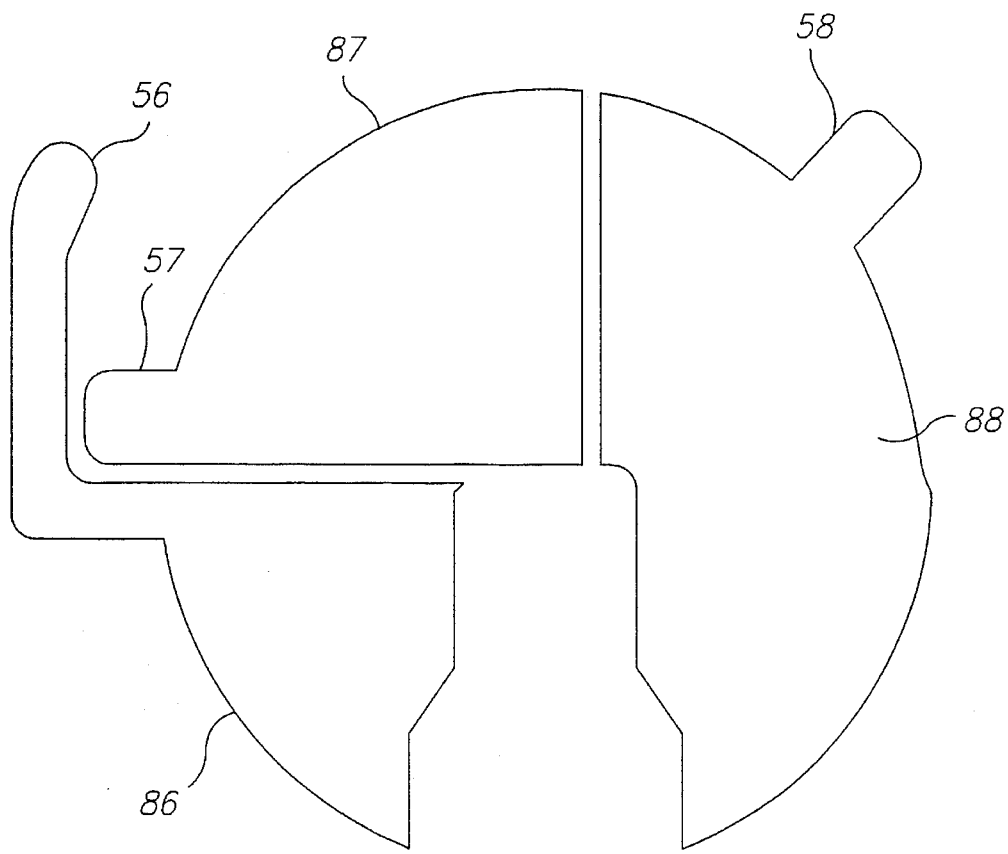
FIG. 5(a) is a plane view of the preferred embodiment of the present invention.

FIG. 5(a) is a preferred embodiment of the planarizing layer of the present invention. The primary objective of the planarizing layer is to provide a planar surface in cooperation with the lower pole piece 22 on which the inductive coil 19 may be formed. In the preferred embodiment, two additional functions are served: 1) the layer provides means for electrically connecting the MR leads of the read head subassembly 24 to corresponding read terminal pads; and 2) it provides means for electrically connecting the inner coil tap 27 of the inductive coil 19 to a corresponding write terminal pad.

The conductive layer comprises three planar sections 86–88 of a conductive metal or a permalloy. Examples of suitable materials include Cu, Au, Pt, Ta, Ti, Rh, Ru, Ag, Pd, W and NiFe. Each section is electrically isolated from the others so that it may serve an independent conductive function. Yet the sections 86–88 are designed to fit in close proximity to one another and to the coated lower pole piece 22, thereby forming a highly planar surface for the inductive coil 19. Each planar section is carefully positioned with respect to its conductive function. That is, when the planar arrangement is included in an MR read/inductive write head, section 86 is positioned over a first MR lead, section 88 is disposed over a second MR lead, and section 87 is directly below the inner coil tap, thereby facilitating functions 2) and 3) (above) of the planarizing layer. The conductive functions are further facilitated by protrusions 56–58, which are designed to extend beyond the perimeter of the inductive coil for easy access by the terminal pads. The protrusions make the MR leads 51, 52 shown in FIG. 6 and inner coil tap 27 accessible to the terminal pads via the conductive planar pieces 86–88.

FIG. 5(b) shows a cross-section of a merged MR/inductive write head having the planarizing layer 53 of the present invention (indicated by the dashed lines). The planarizing layer 53 of FIG. 5(b) extends vertically to the level of lower pole piece 22. Note that all of the inductive coil turns 19 are level. The preferred embodiment of a merged head design including the planarizing layer of the present invention will be described next, with reference to FIGS. 2(b), and 5–10.

Figure 6:
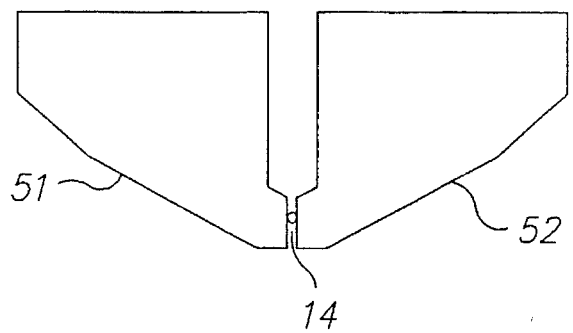
FIG. 6 is a plane view of the MR leads in the preferred embodiment of a merged head assembly with a planarizing layer.

In FIGS. 5(a) and (b), a magnetoresistive head subassembly 24 is formed on a substrate 11 in the same manner as described with reference to FIG. 2. Since two of the planar sections 86, 88 will provide electrical access to the MR leads, the leads themselves are no longer required to extend beyond the perimeter of the inductive coil and may be much smaller than those of the prior art. The reduced MR leads 51, 52 of the preferred embodiment are shown in FIG. 6.

Figure 7:
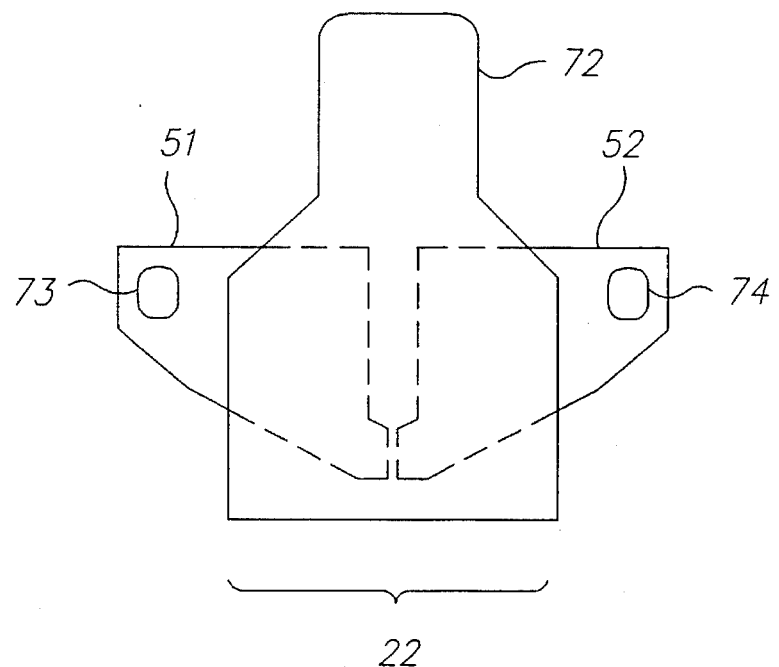
FIG. 7 is a plane view of the lower pole piece and an insulating layer of the preferred merged head assembly shown in relation to the MR leads of FIG. 6.

Referring again to FIG. 5(b), a write head subassembly 25 including the planarizing layer 53 is formed over read head subassembly 24. Section 87 of the planarizing layer 53 electrically couples to the inner coil tap 27 from below, so that the need for an overpass connector 28 is eliminated. The write head 25 is constructed by first forming a lower pole piece 22 on the gap layer 13 of the read head subassembly 24. The lower pole piece 22 is constructed by conventional methods such as electro-plating, sputtering, or CVD. The lower pole piece 22 is next coated with an insulating layer 58. Via holes 73, 74 formed in the insulating layers 13, 58 expose MR leads 51, 52 for later access by the planarizing layer 53, as shown in FIG. 7. The planarizing layer 53 is then formed on the insulating layer 58 to substantially the same level as the coated first pole piece 22, thereby providing a substantially planar surface beneath the inductive coil 19.

Figure 8:
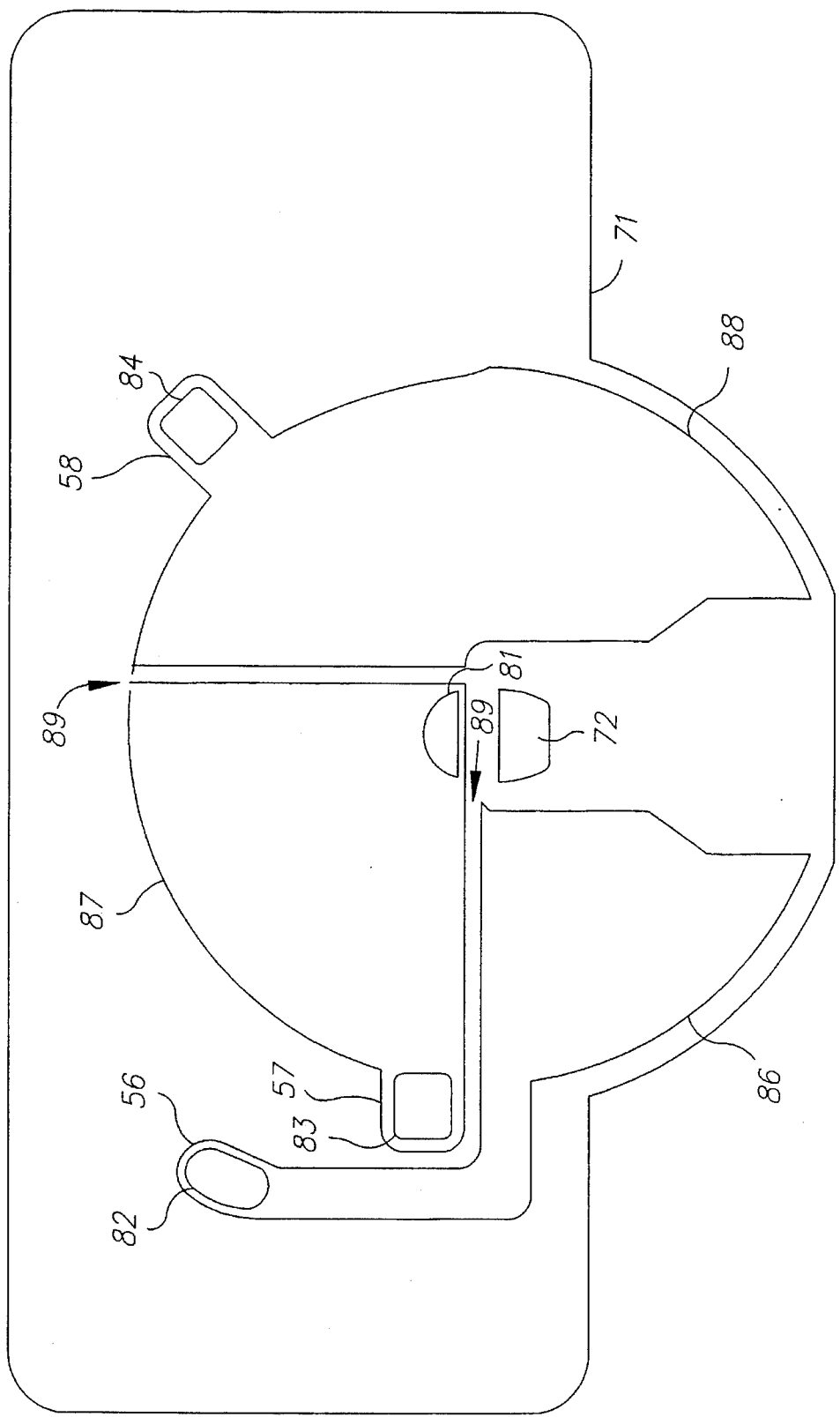
FIG. 8 is a plane view of the preferred embodiment of the planarizing layer for a center-rail merged head design connected in a WRRW terminal pad arrangement.

In the preferred embodiment, the planarizing layer 53 comprises a plurality of conductive elements 86–88 formed by applying a Cu seed layer to the insulating layer 58, and electro-plating thereon to the level of the pole piece 22. In the preferred embodiment, read and write terminal pads 41–44 are also plated about the head structure at this stage to form a symmetrical arrangement like that of FIGS. 4 and 11. Another insulating layer 71 is applied over the planarizing layer 53, electrically isolating the same from the inductive coil 19 and smoothing out small gaps 89 between the planar pieces 86–88. FIG. 8 illustrates the planarizing layer of FIG. 5(a) and insulating layer 71, including via holes 72, 81–84 formed, e.g., by conventional photomask patterning of the insulating material. Via holes 82–84 formed over protrusions 56–58 provide the means by which the terminal pad connectors will access planar sections 86–88. Via hole 81 provides means for planar section 87 to electrically couple to the inner coil tap 27, and via hole 72 keeps the back end of lower pole piece 22 accessible for later coupling to upper pole piece 23.

Figure 9:
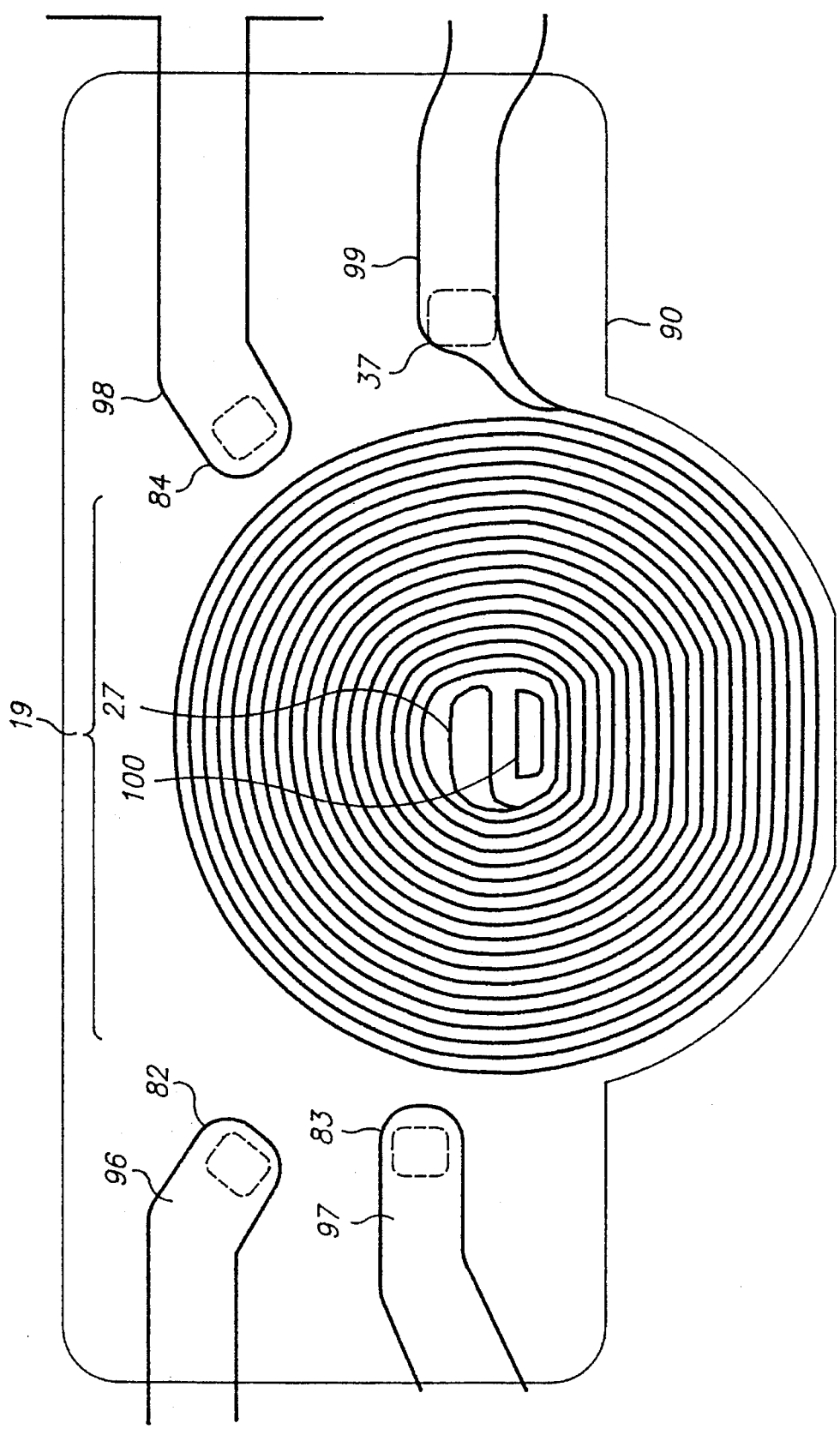
FIG. 9 is a plane view of the inductive write coil, insulating layer and terminal pad connectors formed over the planarization layer of FIG. 8.

Referring to FIG. 9, the inductive coil 19 and terminal pad connectors 96–99 are formed on the insulating layer 71 by conventional methods such as metal electro-plating. Again, any suitable conductive material such as Cu, Au, etc., may be used to build the coil. One end of each terminal pad connector 96–99 is plated directly onto the terminal pads 41–44 shown in FIG. 11. Once the coil 19 is completed, inner coil tap 27 is electrically coupled to conductive element 87 through via hole 81 and outer coil tap 37 forms a portion of write terminal pad connector 99. Terminal pad connectors 96–98 are electrically coupled to the protrusions 56–58 of the planarizing layer 53 through via holes 82–84, respectively. One or more layers 90 of insulating material 18 are then applied over the completed coil 19. Connecting means such as via hole 100 is formed therein, e.g., by conventional photomask patterning, for later electrical access to the lower pole piece 22 by upper pole piece 23, which is subsequently plated on layers 90 over a portion of the insulated coil 19.

Figure 10:
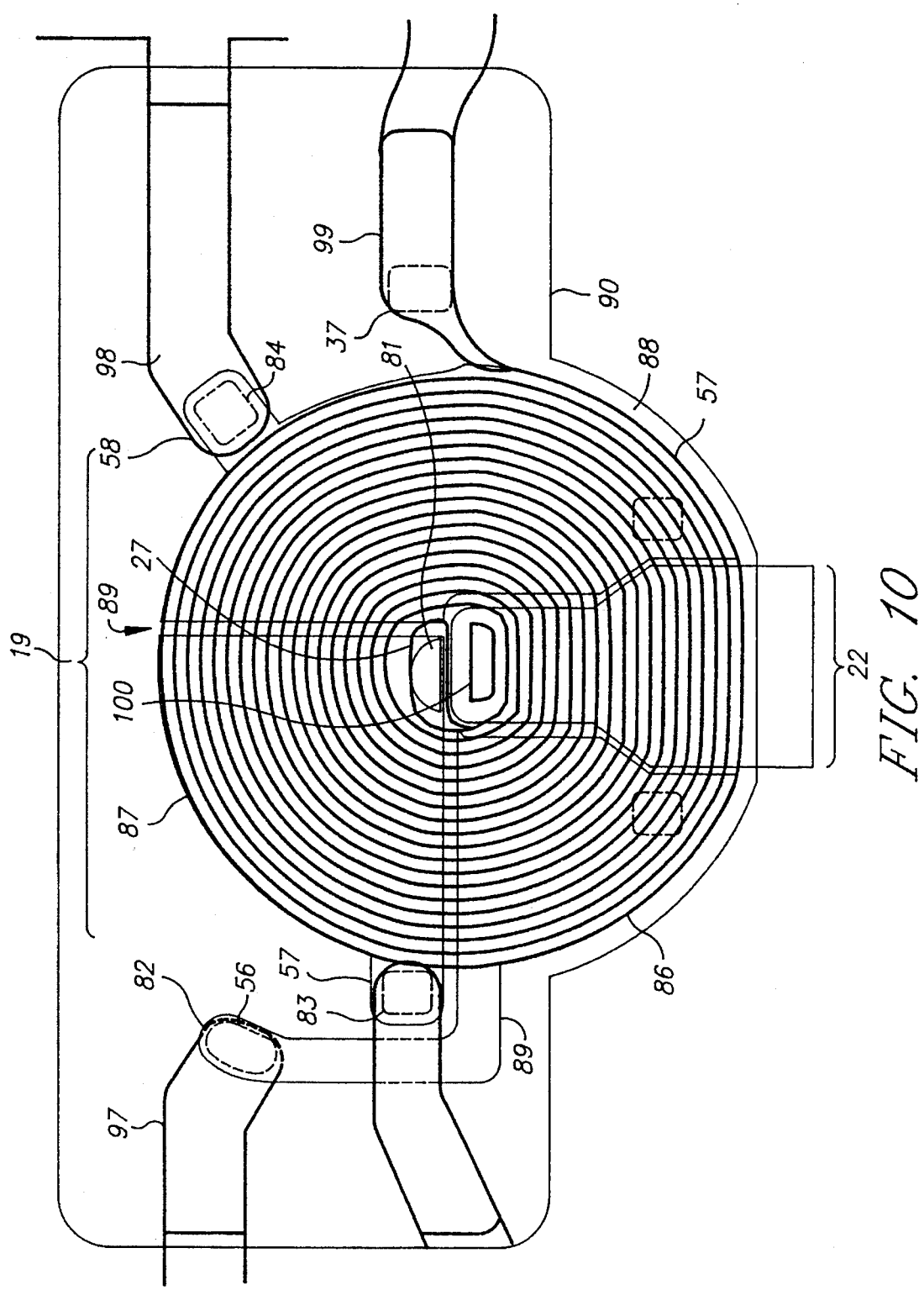
FIG. 10 is a composite of FIGS. 7, 8 and 9.
Figure 11:
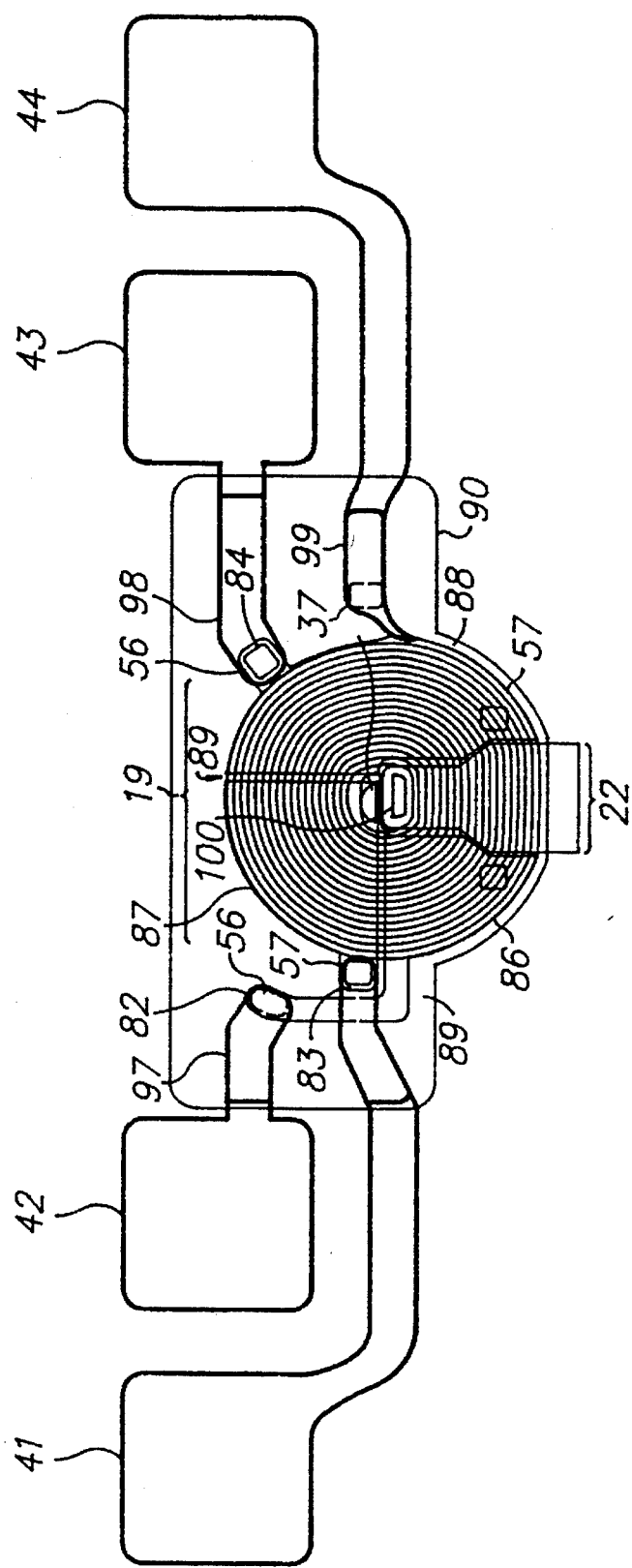
FIG. 11 is the read-write head assembly of FIG. 10 shown in relation to terminal pads arranged in a WRRW configuration.

FIG. 10 is a composite of FIGS. 7–9 showing the relationships of the lower pole piece 22, planar sections 86–88 of the planarizing layer, the inductive coil 19 and terminal pad connectors 96–99. FIG. 11 shows a center-rail terminal pad arrangement appropriate for the read-write structure just described.

Figure 12A:
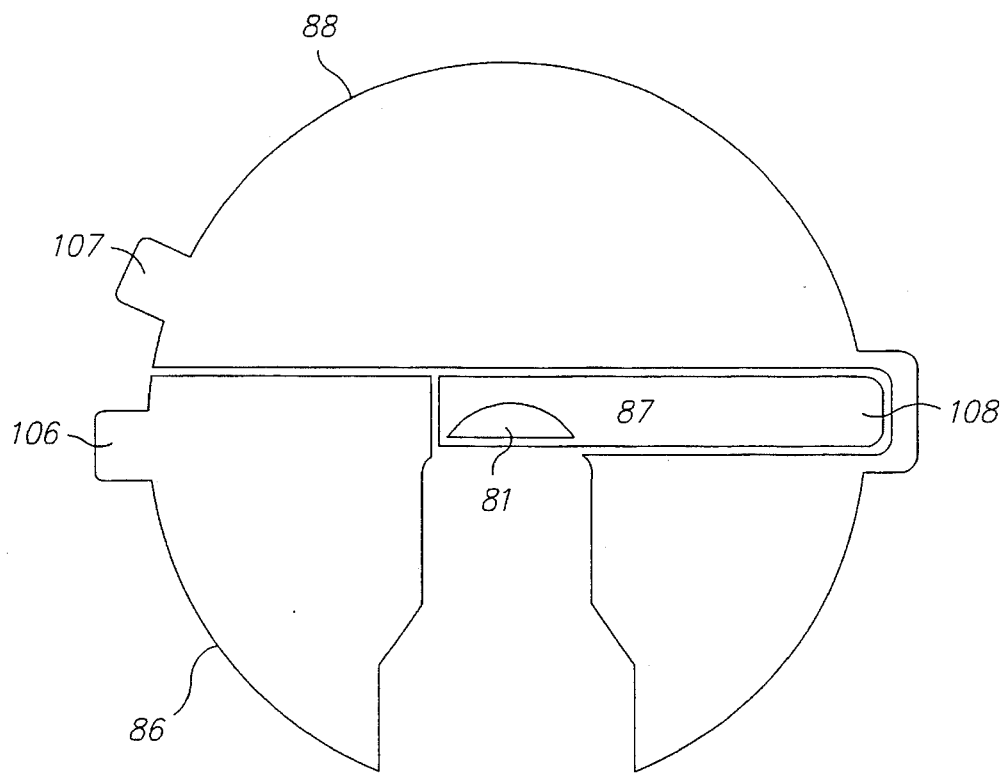
FIGS. 12(a) and (b) are plane views of the preferred embodiment of a planarizing layer in a center-rail head design having a RRWW terminal pad arrangement.
Figure 12B:
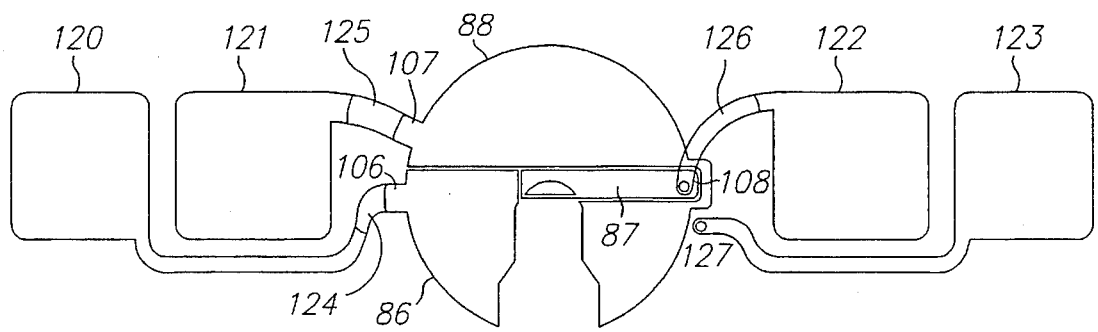

Another preferred embodiment of a planarizing layer is shown in FIGS. 12(a) and (b). As in the configuration of FIG. 5(a), conductive element 86 is electrically coupled to a first MR lead 51 (not shown), element 87 is coupled to the inner coil tap 27, and element 88 is coupled to a second MR lead 52 (not shown). But in contrast to that design, the embodiment of FIG. 12(b) facilitates a terminal pad arrangement in which both read terminal pads 120, 121 are disposed on the same side of the read/write structure, and both write terminal pads 122, 123 are disposed on the other side. One possible interconnection is shown in FIG. 12(b). It should be understood that the mirror images of FIGS. 12(a) and (b) provide yet another suitable center-rail design. First read terminal pad 120 is connected to contact point 106 of conductive element 86 via connector 124. The second read terminal pad 121 adjacent to first read terminal pad 120 is coupled to conductive element 88 at a convenient contact point 107 proximate to the pad 121 by connector 125. First write terminal pad 122 has access to inner coil tap 27 (not shown) via connector 126, which is coupled to conductive element 87 at easily accessible contact point 108. Second write terminal pad 123 connects to outer coil tap 37 (not shown) by connector 127.

Figure 13A:
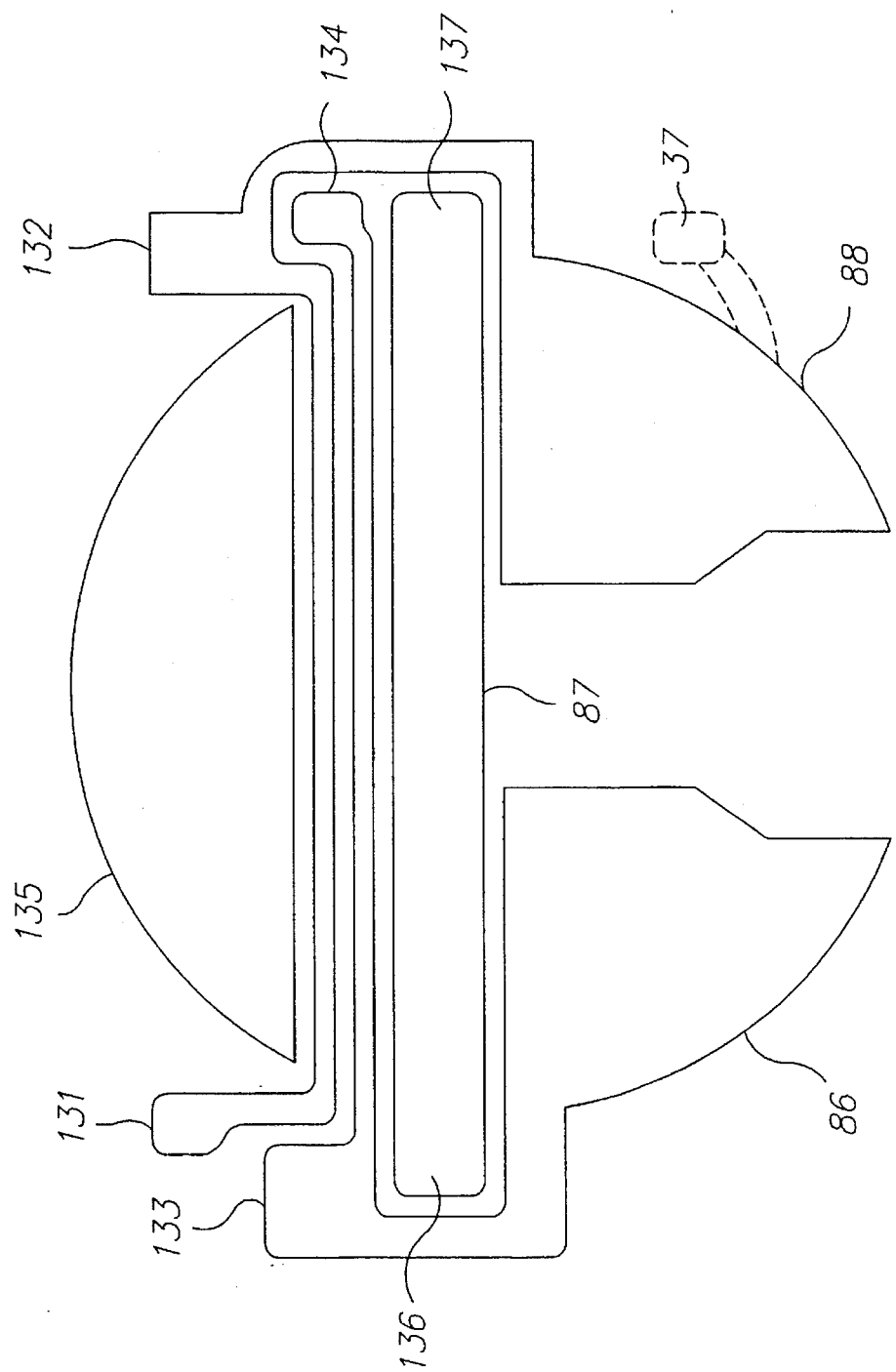
FIGS. 13(a) and (b) are plane views of the preferred embodiment of a planarizing layer in a center-rail head design to be connected in either a WRRW or a RRWW terminal pad arrangement.
Figure 13B:
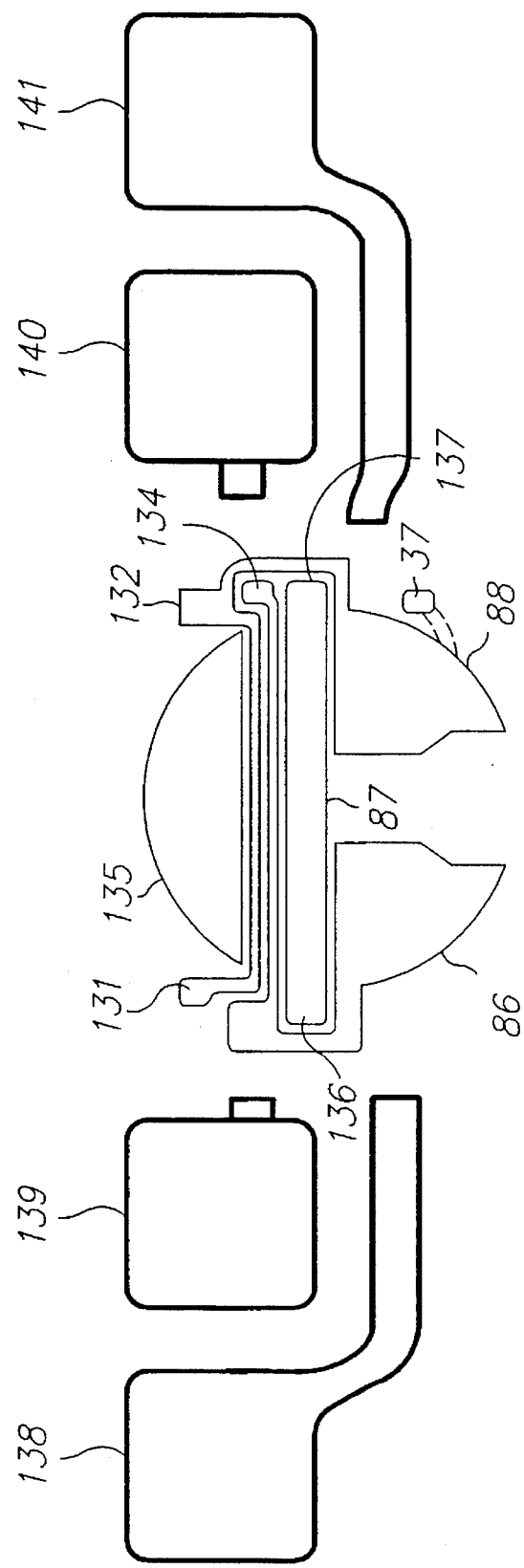

FIGS. 13(a) and (b) illustrate another preferred embodiment of a planarizing layer of the present invention, in this instance easily facilitating a number of possible terminal pad arrangements. As before, conductive elements 86–88 are coupled to MR lead 51, inner coil tap 27, and MR lead 52, respectively. Each conductive element 86–88 has two protrusions extending out from opposing sides of the subsequently-formed inductive coil 19 (not shown). Conductive element 86 includes a pair of protrusions 133, 134. Similarly, conductive element 87 includes protrusions 136, 137 and conductive element 88 includes protrusions 131, 132. Referring to FIG. 13(b), it should be understood by those of ordinary skill in the art that a WRRW center-rail arrangement is achieved by connecting terminal pads 138–141 to contact points 136, 133, 132 and outer coil tap 37, respectively. Alternatively, one RRWW configuration is possible by connecting terminal pads 138–141 to contact points 133, 131, 137 and outer coil tap 37, respectively. Thus either terminal pad arrangement is facilitated by the planarization layer design of FIGS. 13(a) and (b).

It should be understood that the planarizing layer arrangements of FIGS. 8, 11, and 12 are only exemplary and that other arrangements in the plane of the first pole piece 22 in an MR/inductive write head assembly do not depart from the spirit and scope of the underlying invention. For example, a planarizing layer may be utilized in an inductive head, a "merged" head, a "piggy-back" head, or other MR/inductive write head combination having a protruding lower pole piece. In addition, any number of nonconductive or conductive materials may be used to achieve planarization, although the use of conductive materials such as copper provides the additional benefits associated with reduced MR lead size and avoidance of an overpass connector. Furthermore, any number of conductive or nonconductive elements in any number of suitable arrangements may form the planarizing layer around first pole piece 22. Such arrangements may or may not provide electrical access to the MR leads 51, 52 and/or inner coil tap 27 by the terminal pads. If they do provide such a function, they may provide protrusions extending out from under the coil to facilitate a number of possible terminal pad arrangements, including adaptations for both center and side-rail slider designs.

FIGS. 14(a)-(d) show one embodiment of a planarizing layer adapted to a side-rail slider design. The dotted lines 161–164 of FIG. 14(a) indicate the connections which would provide a RRWW arrangement of terminal pads 138–141. FIGS. 14(b)-(d) similarly indicate the connections for WWRR, WRRW and RWWR configurations, by dashed lines 165–176. It will be understood that the examples shown are illustrative rather than exhaustive.

Figure 15:
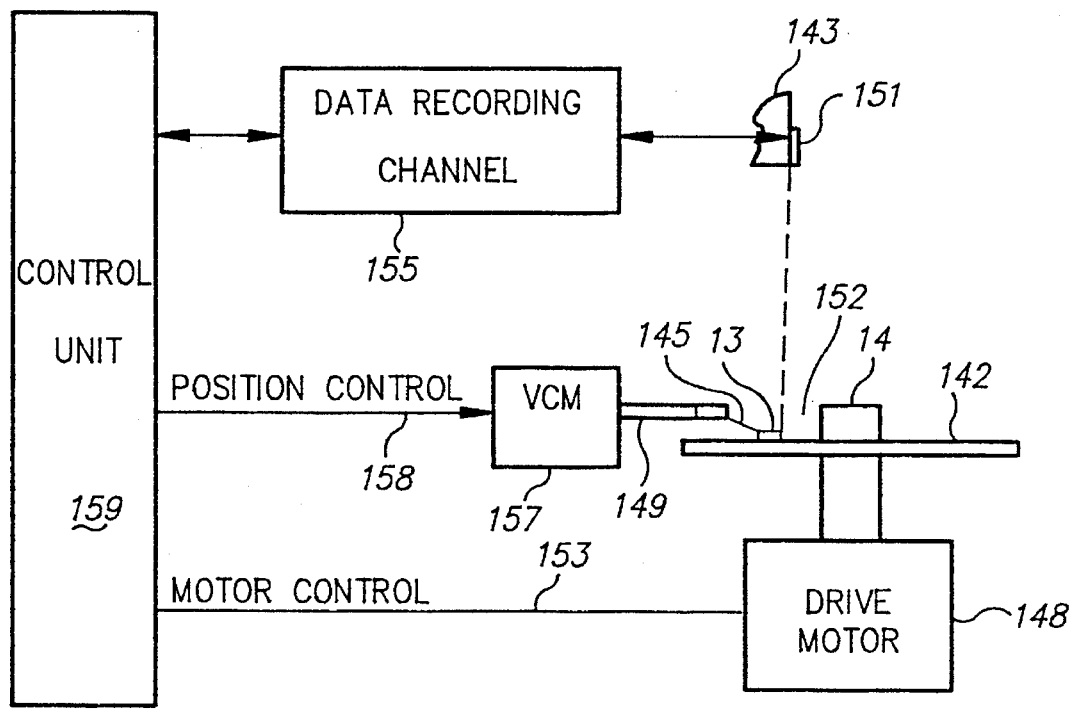
FIG. 15 is a simplified block diagram of a magnetic disk storage system embodying the present invention.

FIG. 15 shows a magnetic disk storage system incorporating an MR/inductive write head assembly according to the present invention. Although the invention is described as embodied in a magnetic disk storage system as shown in FIG. 15, it should be apparent that the invention is also applicable to other magnetic recording systems such as a magnetic tape recording system, for example, or other applications utilizing an inductive write head in combination with a magnetoresistive read head. A magnetic disk storage system comprises at least one rotatable magnetic disk 142 supported on a spindle 144 and rotated by a disk drive motor 148 with at least one slider 143 positioned on the disk 142, each slider 143 supporting one or more magnetic read/write heads 151. The magnetic recording media on each disk is in the form of an annular pattern of concentric data tracks (not shown) on disk 142. As the disks rotate, the sliders 143 are moved radially in and out over the disk surface 152 so that the heads 151 may access different portions of the disk where desired data is recorded. Each slider 143 is attached to an actuator arm 149 by means of a suspension 145. The suspension 145 provides a slight spring force which biases the slider 143 against the disk surface 152. Each actuator arm 149 is attached to an actuator means 157. The actuator means as shown in FIG. 15 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 142 generates an air bearing between the slider 143 and the disk surface 152 which exerts an upward force or lift on the slider. The air bearing thus counterbalances the slight spring force of the suspension 145 and supports the slider 143 off and slightly above the disk surface by a small, substantially constant spacing during operation.

The various components of the disk storage system are controlled in operation by control signals generated by control unit 159, such as access control signals and internal clock signals. Typically, the control unit 159 comprises logic control circuits, storage means and a microprocessor, for example. The control unit 159 generates control signals to control various system operations such as drive motor control signals on line 153 and head position and seek control signals on line 158. The control signals on line 158 provide the desired current profiles to optimally move and position a selected slider 143 to the desired data track on the associated disk 142. Read and write signals are communicated to and from read/write heads 151 by means of recording channel 155.

The above description of a typical magnetic disk storage system, and the accompanying illustration of FIG. 15 are for representation purposes only. It should be apparent that disk storage systems may contain a large number of disks and actuators, and each actuator may support a number of sliders.

We claim:

1. An inductive head assembly formed on a substantially planar first surface, comprising:
   a lower pole piece formed over a first portion of said first surface, having a first pole tip and a first back gap portion;
   at least two electrically isolated planar sections of conductive material formed over a second portion of said first surface in close proximity to and substantially coplanar with said lower pole piece to provide therewith a substantially planar second surface;
   a coil formed over said substantially planar second surface, wherein the center of said coil is disposed over said first back gap portion; and
   an upper pole piece formed over a portion of said coil, said upper pole piece having a second pole tip and a second back gap portion connected to said first back gap portion through said center of said coil, wherein said first and second pole tips form a write gap.

2. The inductive head assembly of claim 1, further comprising means for electrically isolating said at least one planar section from said lower pole piece.

3. The inductive head assembly of claim 2, wherein said isolating means further comprises a gap formed between said at least one planar section and said lower pole piece.

4. The inductive head assembly of claim 2, wherein said isolating means further comprises insulating material formed between said at least one planar section and said lower pole piece.

5. The inductive head assembly of claim 1, further comprising means for electrically isolating said at least one planar section from said coil.

6. The inductive head assembly of claim 5, wherein said insulating means further comprises an insulating layer formed between said planarizing layer and said coil.

7. The inductive head assembly of claim 1, further comprising means for electrically isolating said upper pole piece from said coil.

8. The inductive head assembly of claim 7, wherein said insulating means further comprises an insulating layer formed between said coil and said upper pole piece.

9. The inductive head assembly of claim 1, wherein said at least one planar section is formed by electro-plating, sputtering, or chemical vapor deposition.

10. The inductive head assembly of claim 1, wherein said at least one planar section comprises at least one material selected from the group consisting of: Cu, Au, Pt, Ta, Ti, Rh, Ru, Ag, Pd, W and NiFe.

11. The inductive head assembly of claim 1, further comprising an inner coil tap proximate to the center of said coil, and means for electrically coupling one of said at least two planar sections to said inner coil tap, wherein said one planar section further comprises a conductive portion extending from the outer perimeter of said coil for providing electrical access to said inner coil tap.

12. The inductive head assembly of claim 1, wherein said isolating means further comprises gaps formed between said at least two planar sections.

13. The inductive head assembly of claim 1, wherein said isolating means further comprises insulating material formed between said at least two planar sections.

14. The inductive head assembly of claim 1, wherein each of said at least two planar sections further comprises a conductive portion extending from the outer perimeter of said coil.

15. The inductive head assembly of claim 1, wherein said coil further comprises an outer coil tap on a first side of its outer perimeter, and wherein each of said at least two planar sections further comprises a first conductive portion extending from said first side of said outer perimeter, and a second conductive portion extending from the opposite side of said perimeter.

16. The inductive head assembly of claim 1, wherein said substantially planar first surface is an upper surface of a read head subassembly comprising a lower and an upper shielding layer defining a read gap therebetween, and an MR element formed between said upper and lower shielding layers and substantially vertically aligned with said first and second pole tips, said MR element including first and second MR leads.

17. The inductive head assembly of claim 16, wherein said lower pole piece is said upper shielding layer.

18. The inductive head assembly of claim 17, further comprising means for electrically insulating said MR element and said MR leads from said upper and lower shielding layers.

19. The inductive head assembly of claim 18, wherein said insulating means further comprises a nonconductive gap material formed between said first and second shielding layers.

20. The inductive head assembly of claim 17, further comprising at least two planar sections formed between said first surface and said coil, means for electrically isolating said at least two planar sections from one another, and means for electrically coupling a first and a second of said at least two planar sections to said first and second MR leads, respectively, each of said first and second planar sections further comprising a conductive portion extending from the outer perimeter of said coil for providing electrical access to said first and second MR leads.

21. The inductive head assembly of claim 20, wherein the combined area of said first and second MR leads is smaller than the area of said coil, and wherein said MR leads are disposed entirely within said coil perimeter.

22. The inductive head assembly of claim 20, wherein said coil further comprises an inner coil tap proximate to its center, and further comprising means for electrically coupling a third of said at least two planar sections to said inner coil tap, said third planar section further comprising a conductive portion extending from the outer perimeter of said coil for providing electrical access to said inner coil tap.

23. The inductive head assembly of claim 22, wherein said coil further comprises an outer coil tap on a first side of its outer perimeter, and wherein each of said first, second, and third planar sections further comprises a first conductive portion extending from said first side of said outer perimeter, and a second conductive portion extending from the opposite side of said perimeter.

24. An integrated magnetic head assembly formed on one end of a slider, comprising:

first and second read terminal pads and first and second write terminal pads formed in a predetermined arrangement on said one end;

a read head subassembly comprising a lower and an upper shielding layer defining a read gap therebetween, and an MR element formed between said upper and lower shielding layers, said MR element including first and second MR leads electrically coupled thereto means for electrically coupling said first and second MR leads to said first and second read terminals, respectively;

a write head assembly formed over said read head subassembly, comprising,
      a lower pole piece formed over a first portion of said read head subassembly, having a first pole tip and a first back gap portion,
      at least two electrically isolated planar sections of conductive material formed over a second portion of said read head subassembly in close proximity to and substantially coplanar with said lower pole piece to provide therewith a substantially planar second surface,
      a coil formed over said substantially planar second surface, wherein the center of said coil is disposed over said first back gap portion, said coil including an inner coil tap formed proximate to its center, and an outer coil tap formed at its perimeter, and
      an upper pole piece having a second pole tip and a second back gap portion connected to said first back gap portion through said center of said coil, wherein said first and second pole tips form a write gad therebetween; and means for electrically coupling said inner and outer coil taps to said first and second write pads, respectively.

25. The magnetic head assembly of claim 24, further comprising means for electrically isolating said at least one planar section from said lower pole piece.

26. The magnetic head assembly of claim 25, wherein said isolating means further comprises a gap formed between said at least one planar section and said lower pole piece.

27. The magnetic head assembly of claim 25, wherein said isolating means further comprises insulating material formed between said at least one planar section and said lower pole piece.

28. The magnetic head assembly of claim 24, further comprising means for electrically insulating said at least one planar section from said coil.

29. The magnetic head assembly of claim 28, wherein said insulating means further comprises an insulating layer formed between said planarizing layer and said coil.

30. The magnetic head assembly of claim 24, further comprising means for electrically insulating said upper pole piece from said coil.

31. The magnetic head assembly of claim 30, wherein said insulating means further comprises an insulating layer formed between said coil and said upper pole piece.

32. The magnetic head assembly of claim 24, wherein said at least one planar section is formed by electro-plating, sputtering, or chemical vapor deposition.

33. The magnetic head assembly of claim 24, wherein said at least one planar section comprises at least one material selected from the group consisting of: Cu, Au, Pt, Ta, Ti, Rh, Ru, Ag, Pd, W and NiFe.

34. The magnetic head assembly of claim 24, wherein one of said at least two planar sections further comprises a conductive portion extending from the outer perimeter of said coil, and wherein said means for coupling said inner coil tap to said first write pad terminal further comprises:

means for electrically coupling said one planar section to said inner coil tap; and means for electrically coupling said extended conductive portion to said first write terminal pad.

35. The magnetic head assembly of claim 24, wherein said lower pole piece is said upper shielding layer.

36. The magnetic head assembly of claim 24, further comprising means for electrically insulating said MR element and said MR leads from said upper and lower shielding layers.

37. The magnetic head assembly of claim 36, wherein said insulating means further comprises a nonconductive gap material formed between said first and second shielding layers.

38. The magnetic head assembly of claim 24, wherein said isolating means further comprises gaps formed between said at least two planar sections.

39. The magnetic head assembly of claim 24, wherein said isolating means further comprises insulating material formed between said at least two planar sections.

40. The magnetic head assembly of claim 24, wherein a first and a second of said at least two planar sections each further comprises a conductive portion extending from the outer perimeter of said coil, and wherein said means for electrically coupling said first and second MR leads to said first and second read terminal pads, respectively, further comprises:

means for electrically coupling said first planar section to said first MR lead;

means for electrically coupling said second planar section to said second MR lead;

means for electrically coupling said extended conductive portion of said first planar section to said first read terminal pad; and means for electrically coupling said extended conductive portion of said second planar section to said second read terminal pad.

41. The magnetic head assembly of claim 40, wherein the combined area of said first and second MR leads is smaller than the area of said coil, and wherein said MR leads are disposed entirely within said coil perimeter.

42. The magnetic head assembly of claim 40, wherein a third of said at least two planar sections further comprises a conductive portion extending from the outer perimeter of said coil, and wherein said means for electrically coupling said inner coil tap to said first write terminal pad, further comprises:

means for electrically coupling said third planar section to said inner coil tap; and means for electrically coupling said extended conductive portion of said third planar section to said first write terminal pad.

43. The magnetic head assembly of claim 42, wherein said conductive portion of said third planar section extends from the same side of said coil as said outer coil tap, and wherein said conductive portions of said first and second planar sections extend from the opposite side of said coil.

44. The magnetic head assembly of claim 42, wherein said conductive portion of one of said first and second planar sections extends from the same side of said coil as said outer coil tap, and wherein said conductive portions of the other of said first and second planar sections and of said third planar section extend from the opposite side of said coil.

45. The magnetic head assembly of claim 42, wherein said conductive portions of said first, second and third planar sections extend from the same side of said coil as said outer coil tap.

46. The magnetic head assembly of claim 24, a first, a second, and a third of said at least two planar sections each further comprises a first conductive portion extending from the same side of said coil as said outer coil tap, and a second conductive portion extending from the opposite side of said coil.

47. The magnetic head assembly of claim 24, wherein said read head subassembly and said write head assembly are positioned centrally on said trailing edge.

48. The magnetic head assembly of claim 47, wherein said first and second read terminal Dads are formed on one side of said coil on said trailing edge, and said first and second write terminal pads are formed on the other side of said coil on said trailing edge.

49. The magnetic head assembly of claim 47, where in one of said first and second read terminal pads and one of said first and second write terminal pads is formed on one side of said coil on said trailing edge, and the other of said first and second read terminal pads and the other of said write terminal pads is formed on the other side of said coil on said trailing edge.

50. The magnetic head assembly of claim 24, wherein said read head subassembly and said write head assembly are formed to one side on said trailing edge and said read and write terminal pads are formed to the other side.

51. A data storage system comprising:

a magnetic storage medium having a recording surface for storing information thereon;

a slider, including a trailing end;

an integrated magnetic head assembly formed on said trailing end of a slider and adapted for reading information from and writing information to said recording surface, comprising, first and second read terminal pads and first and second write terminal pads formed in a predetermined arrangement on said trailing end, a read head subassembly comprising a lower and an upper shielding layer defining a read gap therebetween, and an MR element formed between said upper and lower shielding layers, said MR element including first and second MR leads electrically coupled thereto and extending therefrom through said read gap, a write head assembly formed over said read head subassembly, comprising, a lower pole piece formed over a first portion of said read head subassembly, having a first pole tip and a first back gap portion, a plurality of electrically isolated planar sections of conductive material formed over a second portion of said read head subassembly in close proximity to and substantially coplanar with said lower pole piece to provide therewith a substantially planar second surface, a coil formed over said substantially planar second surface, wherein the center of said coil is disposed over said first back gap portion, said coil including an inner coil tap formed proximate to its center and an outer coil tap formed at its outer perimeter, wherein a first, a second, and a third of said plurality of planar sections each comprises a conductive portion extending from the outer perimeter of said coil, and an upper pole piece having a second pole tip and a second back gap portion connected to said first back gap portion through the center of said coil, wherein said first and second pole tips form a write gap therebetween substantially vertically aligned with said read gap, means for electrically coupling said first planar section to said first MR lead, means for electrically coupling said second planar section to said second MR lead, means for electrically coupling said extended conductive portion of said first planar section to said first read terminal pad, means for electrically coupling said extended conductive portion of said second planar section to said second read terminal pad, means for electrically coupling said third planar section to said inner coil tap, means for electrically coupling said extended conductive portion of said third planar section to said first write terminal pad, and means for electrically coupling said outer coil tap to said second write terminal pad;

means for providing relative motion between said magnetic head assembly and said recording surface; and means for selectively positioning said slider in close proximity to said recording surface to facilitate said reading and writing of said information.

\* \* \* \* \*

UNITED STATES PATENT AND TRADEMARK OFFICE
CERTIFICATE OF CORRECTION

PATENT NO. : 5,486,968
DATED : January 23, 1996
INVENTOR(S) : Lee et al.

It is certified that error appears in the above-indentified patent and that said Letters Patent is hereby corrected as shown below:

IN THE CLAIMS

Claim 24, column 10, line 42, delete "gad", insert--gap--.

Claim 48, column 12, line 19, delete "Dads", insert--pads--.

Signed and Sealed this

Sixteenth Day of July, 1996

Attest:

BRUCE LEHMAN

Attesting Officer          Commissioner of Patents and Trademarks